United States Patent
Lippert et al.

(10) Patent No.: US 7,931,458 B2
(45) Date of Patent: Apr. 26, 2011

(54) METHOD AND DEVICES FOR PRODUCING FIBER-REINFORCED COMPONENTS

(75) Inventors: Thomas Lippert, Augsburg (DE); Hans-Wolfgang Schroder, Immenstaad (DE); Franz Stadler, Boehmfeld (DE); Stefan Utecht, Kaufering (DE)

(73) Assignee: EADS Deutschland GmbH, Ottobrunn (DE)

( * ) Notice: Subject to any disclaimer, the term of this patent is extended or adjusted under 35 U.S.C. 154(b) by 1889 days.

(21) Appl. No.: 10/902,172

(22) Filed: Jul. 30, 2004

(65) Prior Publication Data
US 2005/0031720 A1 Feb. 10, 2005

Related U.S. Application Data

(63) Continuation of application No. PCT/DE2003/00177, filed on Jan. 23, 2003.

(30) Foreign Application Priority Data

Jan. 31, 2002 (DE) .................. 102 03 975

(51) Int. Cl.
B29C 70/48 (2006.01)
(52) U.S. Cl. ............ 425/112; 264/257; 425/129.1; 425/405.1; 425/544
(58) Field of Classification Search ............ 264/257, 264/258, 313, 316, 271.1, 279, 279.1; 425/544, 425/112, 129.1, 389, 394, 405.1
See application file for complete search history.

(56) References Cited

U.S. PATENT DOCUMENTS

| 4,562,033 A | * | 12/1985 | Johnson et al. | 264/510 |
| 5,464,337 A | * | 11/1995 | Bernardon et al. | 425/112 |
| 5,576,030 A | * | 11/1996 | Hooper | 425/112 |
| 5,904,972 A | * | 5/1999 | Tunis et al. | 428/178 |
| 6,630,095 B2 | * | 10/2003 | Slaughter et al. | 264/510 |
| 2002/0020934 A1 | | 2/2002 | Hinz | |
| 2003/0011094 A1 | | 1/2003 | Filsinger et al. | |

FOREIGN PATENT DOCUMENTS

| DE | 10013409 | | 11/2000 |
| WO | WO0168353 | * | 9/2001 |

OTHER PUBLICATIONS

English Language Abstract of DE 100 13 409.
U.S. Appl. No. 10/845,225 to Lorenz et al., filed May 14, 2004.

* cited by examiner

*Primary Examiner* — Maria Veronica D Ewald
*Assistant Examiner* — Emmanuel S Luk
(74) *Attorney, Agent, or Firm* — Greenblum & Bernstein P.L.C.

(57) ABSTRACT

Injection structure with a fiber-composite semifinished product for manufacturing a fiber-composite component, having a gate device for feeding matrix material, a distribution fabric, and a barrier layer that is impermeable to the matrix material, wherein the distribution fabric is arranged between the gate device and the fiber-composite semifinished product, and the barrier layer is arranged between the distribution fabric and the fiber-composite semifinished product, as well as device for manufacturing a fiber-composite component by this injection structure.

9 Claims, 1 Drawing Sheet

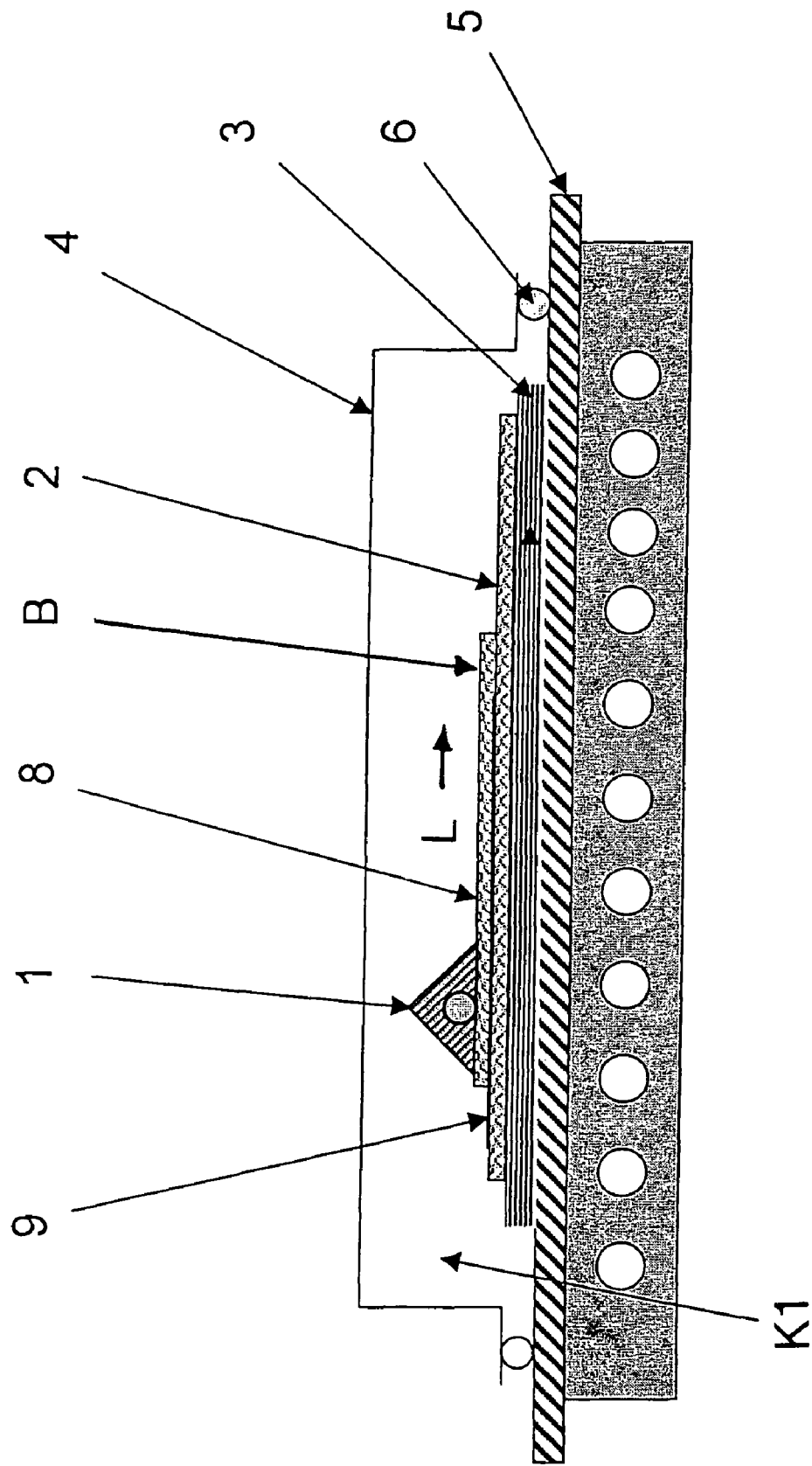

METHOD AND DEVICES FOR PRODUCING FIBER-REINFORCED COMPONENTS

CROSS-REFERENCE TO RELATED APPLICATIONS

The present application is a Continuation of International Application No. PCT/DE03/00177, filed Jan. 23, 2003 and claims priority of German Patent Application No. 102 03 975.5, filed on Jan. 31, 2002. Moreover, the disclosure of International Patent Application No. PCT/DE03/00177 filed Jan. 23, 2003 is expressly incorporated by reference herein in its entirety.

BACKGROUND OF THE INVENTION

1. Field of the Invention

The invention relates to an injection structure in accordance with a fiber-composite semifinished product for manufacturing a fiber-composite component, having a gate device for feeding matrix material, a distribution fabric, and a barrier layer that is impermeable to the matrix material and a method for producing fiber-reinforced plastic components.

2. Discussion of Background Information

In the manufacture of fiber-composite components, hereinafter called FC components, using resin injection methods, pores may be formed as a result of gas bubbles, dissolved gases, and other volatile constituents contained in the matrix material. As a result, the quality of the components is reduced, to the point of unusability.

Described in German patent DE 100 13 409 C1 is a device and a process for manufacturing fiber-reinforced plastic components from dry fiber-composite semifinished products using an injection method for injecting matrix material with a gas-permeable and matrix-material-impermeable membrane, which is arranged around the semifinished product on at least one side and forms a first space and into which matrix material can be introduced, having a flow promoter arranged on a surface of the semifinished product, having a second space, sealed with respect to a tool, adjacent to the first space, which is delimited from the surroundings by a gas-impermeable and matrix-material-impermeable film. Air is removed from the second space by suction, matrix material is drawn from the reservoir into the evacuated first space and the flow promoter causes distribution of the matrix material over the surface of the semifinished product facing it and penetration thereof vertically into the semifinished product.

In this process, the matrix material is distributed by a flow promoter over the fiber-composite semifinished product, and from there penetrates the semifinished product. The flow promoter is delimited on one side by the gas-permeable and matrix-material-impermeable membrane. During transport of the matrix material in the thin flow promoter, degassing of the matrix material takes place. The degassing takes place through the membrane adjoining the flow promoter into the evacuated second chamber. For efficacious degassing, it is necessary for the matrix material to first be able to travel an adequately long distance through the flow promoter before it enters the semifinished product.

In the commonly used gate arrangements for introducing the matrix material into the flow promoter, such film degassing does not occur directly beneath the gates, and occurs only incompletely in the areas directly adjacent thereto. Accordingly, the probability is greater beneath the gates and in the areas adjacent thereto that pore formation will take place.

Another disadvantage of this process resides in that the use of two chambers which requires greater expenditure of auxiliary materials for the membrane as compared to the single-chamber principle likewise known in fiber composite technology.

In addition, degassing of the matrix material can take place according to a method known from the general prior art wherein the matrix material is remelted into a thin layer (film) in an evacuated space. In general, the thinner the matrix material layer to be degassed, the more effective such a degassing process. This process for degassing the matrix material, which is also called film degassing, has the following disadvantages. For example, the additional degassing step is unfavorable with regard to costs and additional inputs; the matrix material must be heated for the degassing step that causes aging processes to occur; the matrix material can again absorb volatile constituents such as water vapor from the air, prior to later processing to produce fiber-composite components; and the matrix material can react with auxiliary materials during the course of the injection process, with the formation of gas. Thus, reactions with low-cost, flexible silicone profiles for gates have been observed.

SUMMARY OF THE INVENTION

It is one aspect of the present invention to provide a method and an injection structure for manufacturing FC components in which or with which advantageous degassing of matrix material occurs during the manufacture of FC components.

One aspect of the present invention includes an injection structure with a fiber-composite semifinished product for manufacturing a fiber-composite component. The structure includes a gate device for feeding matrix material, a distribution fabric, and a barrier layer that is impermeable to the matrix material. The distribution fabric is arranged between the gate device and the fiber-composite semifinished product, and the barrier layer is arranged between the distribution fabric and the fiber-composite semifinished product. The distribution fabric projects beyond the barrier layer on at least one side. Moreover, the barrier layer can be gas-permeable and matrix-material-impermeable. Also, the barrier layer can be a film or panel. Furthermore, the barrier layer can be a PTFE film, an adhesive, and/or a backing fabric, or in the form of a sandwich construction made from these materials.

Another aspect of the invention is a method for manufacturing a fiber-composite component from a fiber-composite semifinished product. A matrix material is fed to a structure in and the matrix material is distributed through a distribution fabric above the barrier layer and in the part of the distribution fabric projecting beyond the barrier layer so that the matrix material arrives from the part of the distribution fabric projecting beyond the barrier layer at the fiber-composite semifinished product and infiltrates it.

One aspect of the present invention includes an injection structure for a fiber-composite semifinished product to manufacture a fiber-composite component. The structure includes a gate device structured to feed matrix material, a distribution fabric, and a barrier layer that is impermeable to the matrix material. The distribution fabric is arranged between the gate device and the fiber-composite semifinished product, and the barrier layer is arranged between the distribution fabric and the fiber-composite semifinished product.

The distribution fabric can project beyond the barrier layer on at least one side. Moreover, the barrier layer can be gas-permeable and matrix-material-impermeable. Furthermore, the barrier layer is a film or a panel. Also, the barrier layer is a PTFE film, an adhesive, a backing fabric, or a sandwich construction made from the PTFE, the adhesive, and the backing fabric. Finally, a fiber-composite material component can be produced from the injection structure. Moreover, the present invention includes a method of manufacturing a fiber-composite component from a fiber-composite semifinished product with the device. The method includes feeding matrix material to the structure, distributing the matrix material through the distribution fabric above the barrier layer and a part of the distribution fabric projecting beyond the barrier layer so that the matrix material arrives from the part of the distribution fabric projecting beyond the barrier layer at the fiber-composite semifinished product and infiltrates it. Furthermore, a fiber-composite material component can be produced from the method of manufacturing.

Another aspect of the present invention includes an injection structure for manufacturing a fiber-composite component. The structure can include a gate device structured to feed matrix material, a distribution fabric arranged between the gate device and a fiber-composite semifinished product, and a barrier layer that is impermeable to the matrix material and that is arranged between the distribution fabric and the fiber-composite semifinished product. The distribution fabric projects beyond the barrier layer on at least one side. Moreover, the barrier layer can be gas-permeable and matrix-material-impermeable. Also, the barrier layer can be a film or a panel. Furthermore, the barrier layer can be a PTFE film, an adhesive, a backing fabric, or a sandwich construction made from the PTFE, the adhesive, and the backing fabric. Finally, a fiber-composite material component can be produced from the injection structure.

Another aspect of the invention includes a method of manufacturing a fiber-composite component. The method includes arranging a distribution fabric between a gate device and a fiber-composite semifinished product, arranging a barrier layer, that is impermeable to the matrix material, between the distribution fabric and the fiber-composite semifinished product, and feeding a matrix material through the gate device. The distribution fabric projects beyond the barrier layer on at least one side. Furthermore, the barrier layer can be gas-permeable and matrix-material-impermeable. Also, the barrier layer can be a film or a panel. Moreover, the barrier layer can be a PTFE film, an adhesive, a backing fabric, or a sandwich construction made from the PTFE, the adhesive, and the backing fabric. Finally, a fiber-composite material component can be produced from the method of manufacturing.

In accordance with the present invention, an injection structure with a fiber-composite semifinished product is provided for manufacturing a fiber-composite component, which has a gate device for feeding matrix material, a distribution fabric, and a barrier layer that is impermeable to the matrix material, wherein the distribution fabric is arranged between the gate device and the fiber-composite semifinished product, and the barrier layer is arranged between the distribution fabric and the fiber-composite semifinished product.

In accordance with the present invention, degassing is provided with the aid of a matrix-material-impermeable auxiliary material or distribution fabric in combination with a barrier layer placed between the latter and the fiber-composite semifinished product. Such a barrier layer can be realized with a PTFE film, an adhesive, and/or a backing fabric, or in the form of a sandwich construction made from these materials.

By this device, the probability of the occurrence of pores can be reduced and, as a result, the ruggedness of the fabrication increased.

The invention may be implemented in combination with the device and/or the method from German patent DE 100 13 409 C1 or with other devices or methods from the prior art. The invention may be used in combination with a single-chamber structure and in combination with a dual-chamber structure.

BRIEF DESCRIPTION OF THE DRAWINGS

The FIGURE shows an exemplary injection structure with an embodiment of the degassing device in accordance with the invention, wherein only a first chamber of a dual-chamber structure of the injection structure is shown in the FIGURE.

DETAILED DESCRIPTION OF THE PRESENT INVENTION

In accordance with the invention, a degassing device for the matrix material used in the manufacture of FC components is provided. In one embodiment of the invention, prior to entry or penetration into the nonwoven textile fabric of fibers or reinforcing fibers to be infiltrated, the matrix material is degassed by at least one resin-impermeable film or barrier film in combination with a distribution fabric or a flow promoter. This involves a single-layer or multi-layer film that does not allow the matrix material to pass. The film may allow gaseous constituents of the matrix material to pass or may be gas-impermeable. This embodiment is in a structure with the fiber-composite nonwoven fabric or a component production device with the nonwoven textile fabric, i.e. it is integrated spatially in the structure with the fiber-composite nonwoven fabric.

In this context, material referred to as textile fabric is understood to be a dry or pretreated fiber-composite fabric or nonwoven fabric from which a fiber-composite component can be manufactured after resin infiltration and after treatment in an autoclave.

In the embodiment shown in the FIGURE of the degassing device integrated in a structure with the fiber-composite nonwoven fabric or a component production device, the structure consists of at least two chambers wherein only one of the two chambers, which is identified with reference symbol K1, is shown in the FIGURE. Chamber K1 is separated from another chamber by a semi-permeable film 4, which is gas-permeable and impermeable to resin or matrix material. In this way, air can be withdrawn through the second chamber after the infiltration of resin into the first chamber K1. The invention may also be used for a single-chamber structure (not shown).

The structure shown in the FIGURE with the fiber-composite nonwoven fabric or injection structure comprises a gate device 1 or a feeder channel for resin, an additional degassing area distribution fabric or gate distribution fabric 8 and a layer or barrier layer 9 impermeable to the matrix material in the form of a film or panel. The barrier layer 9 may be gas-permeable or gas-impermeable. The gate distribution fabric 8 is located between the gate device 1 and the fiber-composite semifinished product 3. The barrier layer 9 is arranged between the gate distribution fabric 8 and the fiber-composite semifinished product 3.

The fiber-composite semifinished product 3 is placed on a mold 5 or support device 5. A mold may be provided to form an outside of the fiber-composite component to be manufactured. A support device 5 can be a supporting plate, for example. Preferably, there is placed between the barrier film 9 and the fiber-composite semifinished product 3 another distribution fabric, which can be provided according to the prior art in order to distribute the resin over the fiber-composite semifinished product 3. The first chamber of the structure from the FIGURE is formed by the film 4, which is sealed with respect to the mold or the support device 5 by a sealing strip 6.

The distribution fabric 8 preferably projects beyond the barrier layer 9 in one direction (for example direction L) or in multiple directions. In this way, the resin coming from the gate device 1 and to be degassed can flow through the distribution fabric 8 facing the latter, and because of the barrier layer 9 is at first not allowed to the fiber-composite nonwoven fabric. The distribution fabric 8 is placed in the region of the gate device 1. Not until the resin has reached the region B, which overhangs relative to the barrier layer 9, of the gate distribution fabric 8 can it arrive from there at the fiber-composite semifinished product 3 in order to infiltrate it.

Such a barrier layer 9 can be realized with a PTFE film, an adhesive, and/or a backing fabric, or in the form of a sandwich construction made from these materials.

The flow promoter or the distribution fabric 2 between the fiber-composite semifinished product 3 and the barrier layer 9 can be omitted in the structure with the fiber-composite semifinished product. The barrier layer 9 can be a film or a panel. As a panel, it can be composed of a metal sheet or another elastic or rigid tool.

During injection, the matrix material first flows through the gate device 1 into a degassing region located around the latter. Gas bubbles, dissolved gases, and other volatile constituents entrained by the matrix material can exit through the semi-permeable film 4 into the evacuated region (chamber 2 of the VAP process).

The barrier layer 9 can, in particular, concern a semi-permeable film, i.e. the film that is permeable to gases and impermeable to matrix material. Such a semi-permeable film would achieve additional degassing in the region of the chamber K1 at the start of the injection process. It is likewise possible to use a pressure plate as the barrier layer 9, as is required in any case in the manufacture of some fiber-composite components.

The degassing distribution fabric 8 can, in special applications, also be placed over the barrier layer 9 overlapping on both sides. However, this can have the result that two matrix material fronts meet beneath the barrier layer 9. Such a flow line situation should be avoided if possible, since residual air from the never entirely perfect technical vacuum can be entrapped in the flow line region. This, in turn, can lead to pores in the flow line region. The formation of flow lines beneath the barrier layer 9 is avoided in that the degassing distribution fabric 8 is conducted onto the distribution fabric 2 only on one side.

In the degassing region, the matrix material stands in contact with a resin-impermeable barrier layer on one or both sides. Through the latter, degassing can take place into an evacuated space. Because of the barrier layer in the degassing region, the matrix material cannot enter the fiber nonwoven fabric before its degassing.

In the method according to the invention, the fiber-composite semifinished product 3 is placed on a support device 5. On the fiber-composite semifinished product 3 is placed at least the barrier layer 9, and on that the gate distribution fabric 8. Then matrix material is inserted through the gate device 1 into the chamber K1 formed by the film 4, subsequently spreads therein through the distribution fabric 2 over the barrier layer 9 and from there around the barrier layer to reach the fiber-composite semifinished product 3. In a subsequent process, infiltration of the fiber-composite semifinished product 3 and curing of the same takes place.

The invention claimed is:

1. An injection structure for a fiber-composite semifinished product to manufacture a fiber-composite component, the structure comprising:
a gate device structured to feed matrix material;
a distribution fabric;
a barrier layer that is impermeable to the matrix material; and
a semi-permeable film that is arranged to form a chamber within which the gate device, the distribution fabric and the barrier layer are located, and that is structured to allow air to be withdrawn from the chamber after the matrix material has been fed,
wherein the distribution fabric is positionable between the gate device and the fiber-composite semifinished product, and the barrier layer is positionable between the distribution fabric and the fiber-composite semifinished product.

2. The injection structure according to claim 1, wherein the distribution fabric projects beyond the barrier layer on at least one side.

3. The injection structure according to claim 1, wherein the barrier layer is gas-permeable and matrix-material-impermeable.

4. The injection structure according to claim 1 wherein the barrier layer is a film or a panel.

5. The injection structure according to claim 1, wherein the barrier layer is a PTFE film, an adhesive, a backing fabric, or a sandwich construction made from the PTFE, the adhesive, and the backing fabric.

6. An injection structure for manufacturing a fiber-composite component, the structure comprising:
a gate device structured to feed matrix material;
a distribution fabric positionable between the gate device and a fiber-composite semifinished product; and
a barrier layer that is impermeable to the matrix material and that is positionable between the distribution fabric and the fiber-composite semifinished product,
wherein the distribution fabric projects beyond the barrier layer on at least one side.

7. The injection structure according to claim 6, wherein the barrier layer is gas-permeable and matrix-material-impermeable.

8. The injection structure according to claim 6 wherein the barrier layer is a film or a panel.

9. The Injection structure according to claim 6, wherein the bather layer is a PTFE film, an adhesive, a backing fabric, or a sandwich construction made from the PTFE, the adhesive, and the backing fabric.

* * * * *